United States Patent [19]

Burleigh et al.

[11] Patent Number: 4,790,601
[45] Date of Patent: Dec. 13, 1988

[54] CHILD'S SEAT FOR A MOTOR VEHICLE

[75] Inventors: David W. Burleigh, Bognor Regis, England; Waldemar Czernakowski, Blaustein; Hermann Wetter, Ulm, both of Fed. Rep. of Germany

[73] Assignees: Britax-Excelsior Limited, England; Romer-Britax Autogurte GmbH, Fed. Rep. of Germany

[21] Appl. No.: 177,769

[22] Filed: Apr. 5, 1988

[30] Foreign Application Priority Data

Apr. 15, 1987 [GB] United Kingdom ............... 8709141

[51] Int. Cl.⁴ ............................................. A47D 15/00
[52] U.S. Cl. ..................................... 297/484; 297/473
[58] Field of Search ................ 297/484, 468, 475, 485

[56] References Cited

U.S. PATENT DOCUMENTS 3,910,634 10/1975 Morris .................................. 297/484
4,040,664 8/1977 Tanaka et al. ....................... 297/484
4,402,548 9/1983 Mason ................................. 297/484
4,436,341 3/1984 Converse ............................ 297/484

Primary Examiner—Francis K. Zugel
Attorney, Agent, or Firm—Davis, Bujold & Streck

[57] ABSTRACT

A child's seat for a motor vehicle comprises a back portion and a harness including two shoulder straps each of which projects through a respective opening in the back portion. Each opening is formed by the interaction of an elongate slot formed in the back portion and extending over the range of desired positions for the opening, with a horizontal slot in a carriage mounted on the rear side of the back portion for vertical sliding movement relative thereto. Manually operable control means is arranged to vary the position of the carriage relative to the back portion.

8 Claims, 3 Drawing Sheets

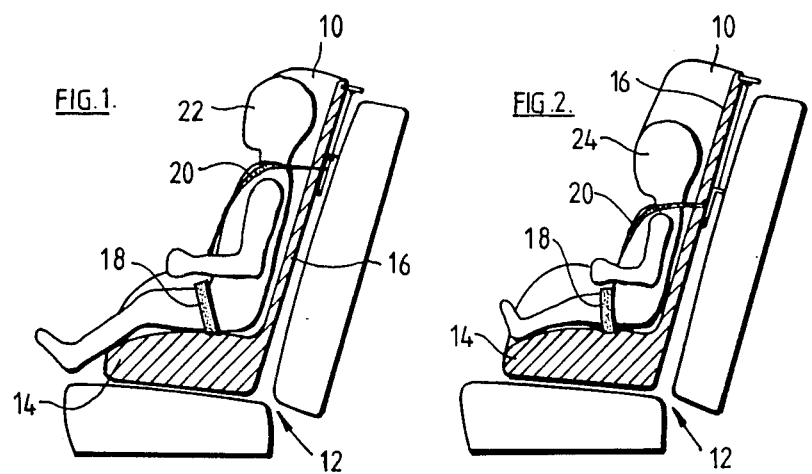
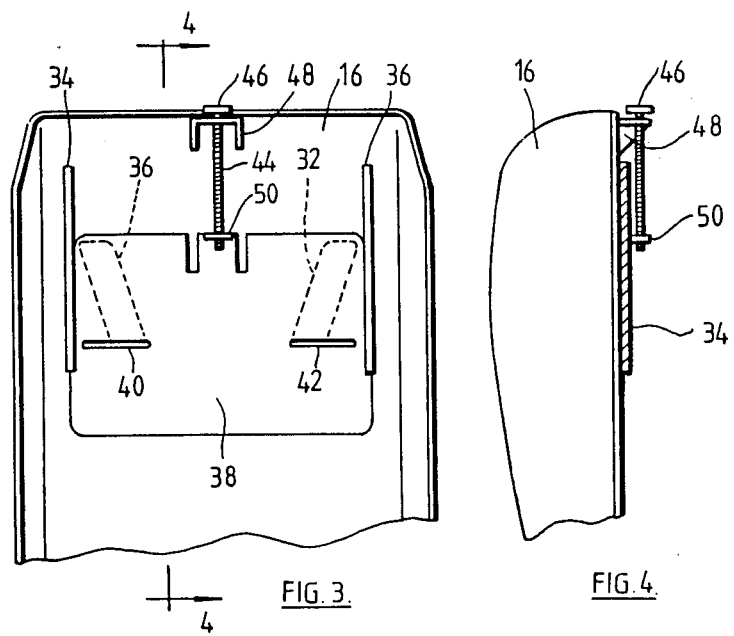

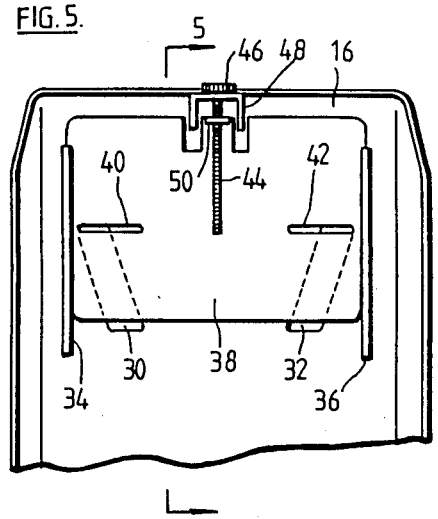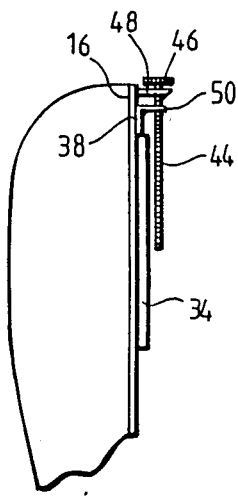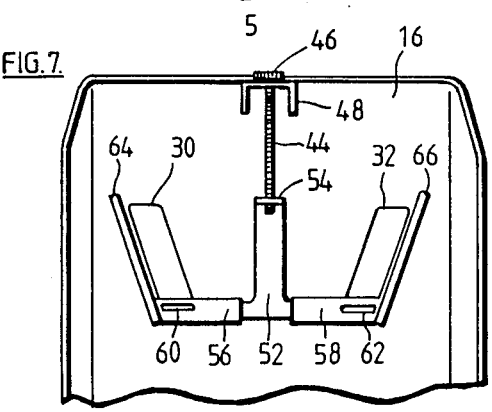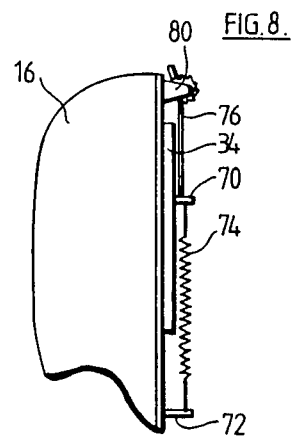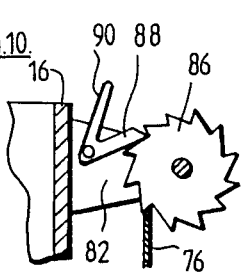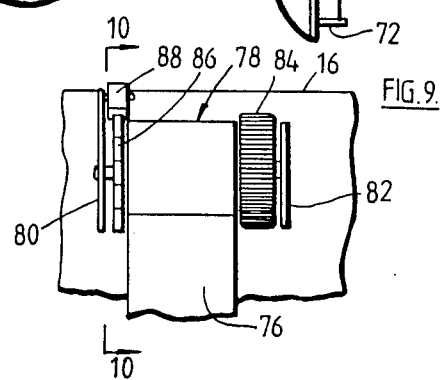

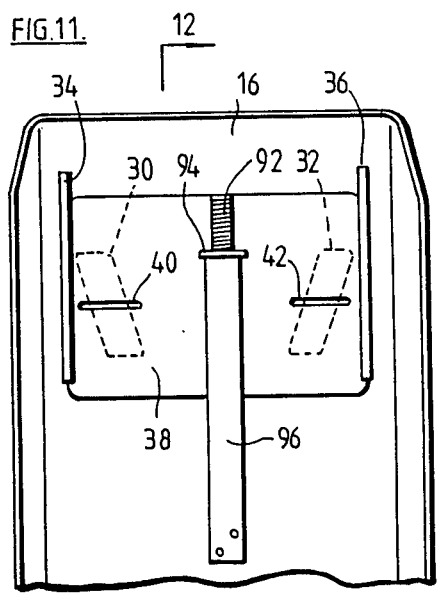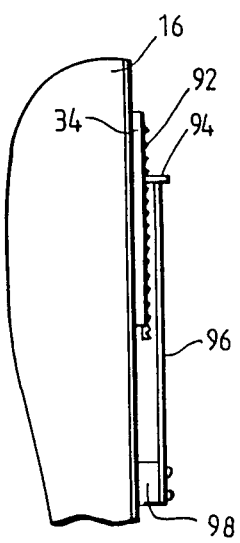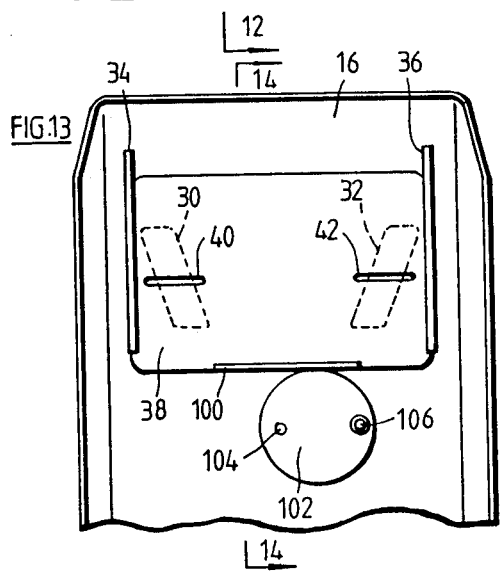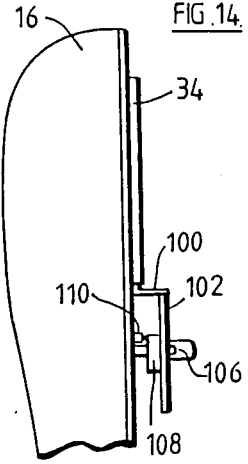

CHILD'S SEAT FOR A MOTOR VEHICLE

This invention relates to a child's seat for a motor vehicle of the type having a back portion and a harness including two shoulder straps each of which projects through a respective opening in the back portion.

The optimum position for the two openings for the shoulder straps varies not only as the child occupant of the seat grows, but also in dependence on the thickness of the garments such occupant is wearing. Patent specification GB-A-No. 1384322 discloses a child's seat of this type in which three separate slots are provided at alternative positions for each of the shoulders straps so as to provide a measure of adjustment. However, in order to carry out this adjustment, it is necessary to dismantle the harness in order to thread each shoulder strap through the required opening. The present invention aims to provide a child's seat which is not subject to this disadvantage.

According to the invention, a child safety seat of the foregoing type comprises two elongate slots in the back portion each of which extends over the range of desired positions for the opening for a respective shoulder strap, a carriage mounted on the rear side of the back portion for vertical sliding movement relative thereto and having a respective horizontal slot aligned with each of the elongate slots in the back portion so as to define a respective opening for each shoulder strap, and control means for varying the position of the carriage relative to the back portion.

Preferably the elongate slots are inclined so that their upper ends are further apart than their lower ends. The result of this is that, as the openings for the shoulder straps are moved upwardly, they also move further apart.

In one form of the invention, the two horizontal slots are formed in the same component of the carriage, each horizontal slot extending over the range of horizontal movement of the corresponding opening, the horizontal surfaces of the openings being defined by the walls of the horizontal slots and the vertical edges of the openings being defined by the edges of the elongate slots.

In another form of the invention, each of the horizontal slots is of the same dimensions as the corresponding opening and is formed in a respective auxiliary carriage which is slideable horizontally relative to the main carriage and coupled to guide means extending parallel to the corresponding elongate slot.

Embodiments of the invention will now be described, by way of example, with reference to the accompanying drawings, in which:

FIG. 1 is a transverse cross-sectional view showing a seat in accordance with the invention occupied by a relatively large child;

FIG. 2 is a cross-sectional view, similar to FIG. 1 showing the seat occupied by a smaller child;

FIG. 3 is an elevational view from behind of the upper part of the seat-back of the seat shown in FIG. 1, with the slots for the shoulder straps in their lowermost position;

FIG. 4 is a cross-sectional view taken on the line 4—4 in FIG. 3;

FIG. 5 is an elevational view, similar to FIG. 3, but showing the slots for the shoulder straps in their uppermost position;

FIG. 6 is a cross-sectional view taken on the line 6—6 in FIG. 5;

FIG. 7 is an elevational view, similar to FIG. 3, of a second embodiment of the invention;

FIG. 8 is a cross-sectional view, similar to FIG. 4, of a third embodiment of the invention;

FIG. 9 is a scrap rear elevational view of the top part of the embodiment illustrated in FIG. 8;

FIG. 10 is a cross-sectional view taken on the line 10—10 in FIG. 9;

FIG. 11 is an elevational view, similar to FIG. 3, of a fourth embodiment of the invention but with the openings in an intermediate position along their range of adjustment;

FIG. 12 is a cross-sectional view taken on the line 12—12 in FIG. 11;

FIG. 13 is an elevational view, similar to FIG. 11, of a fifth embodiment of the invention;

FIG. 14 is a cross-sectional view taken on the line 14—14 in FIG. 13.

FIG. 1 shows a child's seat 10 secured by attachment means (not shown) to an adult seat 12 of a motor vehicle. The child's seat 10 has a seat portion 14 and a back portion 16 together with a harness comprising a pair of lap straps 18 and a pair of shoulder straps 20. The seat 10 is occupied by a relatively large child 22 and consequently the attachments for the shoulder straps 20 are adjusted to a relatively high position. FIG. 2 shows the same seat 10 occupied by a smaller child 24. The attachments for the shoulder straps 20 are in their lowest position.

Turning to FIGS. 3 to 6, the seat back 16 has a pair of elongate slots 30 and 32 which are symmetrically disposed with respect to the vertical centre line of the seat back and inclined so that their upper ends are more widely spaced apart than their lower ends. On the rear face of the seat back 16, outside the slots 30 and 32, are a pair of guide tracks 34 and 36, each of which has a longitudinally extending groove on the face thereof confronting the other track. A traveller plate 38 engages in these grooves so as to be slidable vertically relative to the seat back. The plate 38 has two horizontally extending slots 40 and 42, each of which is located so that its outer end is coincident with the upper outer corner of the corresponding elongate slot 30, 32 in the seat back, when the plate 38 is in its uppermost position illustrated in FIG. 5. Similarly the inner end of each of the slots 40 and 42 is coincident with the bottom inner corner of the corresponding elongate slot 30, 32 when the plate 38 is in its lowest position illustrated in FIG. 3.

A vertically extending screw-threaded rod 44 carries a knurled knob 46 on its upper end. Immediately below the knob 46, the rod 44 is journaled in a bracket 48 secured to the top edge of the seat back 16. The rod 44 is free to rotate relatively to the bracket 48 but is restrained against axial movement relative thereto. The lower end of the rod 44 engages in a tapped hole in a flange 50 formed on the top edge of the plate 38. Rotation of the knob 46 causes the plate 38 to move between its lowest position illustrated in FIG. 3 and its highest position illustrated in FIG. 5. In use, one of the shoulder straps 20 projects through the slots 30 and 40 and the other through the slots 32 and 42. Thus, upward movement of the plate 38 causes the openings for the shoulder straps 20 to move upwardly and apart from each other.

FIG. 7 illustrates another embodiment of the invention in which the traveller plate 38 of FIGS. 3 and 5 is replaced by a T-shaped main traveller 52 having a flange 54 with a tapped hole for engagement with the rod 44 on its stem. Each of the side arms of the T-shape carries a respective laterally moveable slider 56, 58, with respective horizontal slots 60, 62 therein. The guide tracks 34 and 36 of FIGS. 3 and 5 are replaced by guide tracks 64 and 66 which extend parallel to the outer edges of the inclined slots 30 and 32 respectively. Each of the guide tracks 64 and 66 has a cross-section (not shown in detail) which interlocks with a complementary formation on the corresponding slider 56, 58 so as to prevent the sliders 56 and 58 from moving towards one another as well as apart from one another.

Rotation of the knob 46 has the effect of varying the positions of the openings provided by the slots 60 and 62 in a similar manner to that described with reference to FIGS. 3 to 6. The slots 60 and 62 determine the lateral limits of the openings for the shoulders straps 20 as well as the vertical limits. Consequently any risk of the shoulder straps 20 becoming jammed between the traveller and the seat back 16 is reduced.

FIGS. 8 to 10 illustrate an alternative mechanism for adjusting the height of the traveller 38 of FIG. 3. It can also be applied to the traveller 52 of FIG. 7. The flange 50 on the top edge of the traveller 38 is replaced by a flange 70 which is connected to an anchorage 72 below the traveller by a tension spring 74. The flange 70 is also connected to one end of a webbing strap 76, the other end of which is wound on a drum 78 which is journaled between the limbs 80 and 82 of a U-shaped bracket which is secured to the seat back 16 near its top edge. One of the flanges of the drum 78 is formed by a knurled thumb-wheel 84. The other flange is formed by a ratchet wheel 86 which is engaged by a pawl 88 which is pivotally mounted on the side limb 80 of the U-shaped bracket and biased into its engaged position by spring means (not shown). The pawl 88 has a side arm 90 whereby it may be manually moved clear of the ratchet wheel 86.

FIGS. 11 and 12 illustrate a further alternative adjustment mechanism for the traveller 38. A vertically extending row of ratchet teeth 92 is located centrally on the traveller 38 and engaged by a detent 94 mounted on a spring steel arm 96, the bottom end of which is secured to a bracket 98 mounted on the seat back 16 below the bottom of the traveller 38. When the detent 94 is displaced rearwardly out of engagement with the teeth 92, the plate 38 can be moved relative to the seat back 16.

FIGS. 13 and 14 illustrate a further adjustment mechanism for the traveller 38 which, for this embodiment, has a horizontal flange 100 formed on its bottom edge. The flange 100 is engaged by a cam wheel 102 which is eccentrically journaled on a axle pin 104 secured to the seat back 16. A hand grip 106 enables the cam wheel 102 to be rotated in order to effect vertical movement of the traveller 38.

As can best be seen from FIG. 14, the cam wheel 102 carries a series of detent formations 108 on its inner face spaced around the axle pin 104. The detent formations are engaged by a spring-loaded ball catch 110 which retains the cam wheel 102 in any one of a multiplicity of positions in which it is set.

The adjustment mechanisms illustrated in FIGS. 3 to 10 are accessible when the child seat 10 is in position on the vehicle seat 12 and are therefore suitable for use when this facility is desired. The adjustment mechanisms illustrated in FIGS. 11 to 14 are not accessible unless the child seat 10 is first removed from the vehicle seat 12 and are therefore suitable for use when it is desired to prevent a child from tampering with the mechanism.

The invention has the advantage that adjustment of the postions of the openings for the shoulder straps can be made with one hand.

We claim:

1. A child's seat for a motor vehicle comprising a back portion, a harness including two shoulder straps, two elongate slots formed in the back portion with each slot extending over the range of desired positions for the opening for a respective shoulder strap, a carriage mounted on the rear side of the back portion for vertical sliding movement relative thereto, two horizontal slots in the carriage each aligned with a respective one of the elongate slots in the back portion so as to define a respective opening for each shoulder strap, and control means for varying the position of the carriage relative to the back portion.

2. A child's seat according to claim 1, wherein the elongate slots are inclined so that their upper ends are further apart than their lower ends.

3. A child's seat according to claim 1, wherein the two horizontal slots are formed in the same component of the carriage, each horizontal slot extending over the range of horizontal movement of the corresponding opening, the horizontal surfaces of the openings being defined by the walls of the horizontal slots and the vertical edges of the openings being defined by the edges of the elongate slots.

4. A child's seat according to claim 1, wherein each of the horizontal slots is of the same dimensions as the corresponding opening and is formed in a respective auxiliary carriage which is slideable horizontally relative to the main carriage and coupled to guide means extending parallel to the corresponding elongate slot.

5. A child's seat according to claim 1, wherein the control means comprises a screw-threaded rod journaled in a bearing secured adjacent to the top edge of the rear surface of the seat back and engaging in a tapped hole in the carriage.

6. A child's seat according to claim 1, wherein the control means comprises a spring arranged to bias the carriage downwardly relative to the seat back and a flexible tension member having one end connected to the carriage and its other end wound on a drum which is rotatable mounted adjacent to the top edge of the rear surface of the seat back, a manually releasable ratchet assembly being arranged to resist rotation of the drum in the unwinding direction.

7. A child's seat according to claim 1, wherein the control means comprises a vertically oriented row of ratchet teeth on the rear carriage and a detent mounted on a resilient arm which has one end secured to the rear of the seat back.

8. A child's seat according to claim 1, wherein the control means comprises a cam wheel eccentrically journaled on an axle secured to the rear iof the seat back, the edge of the cam wheel engaging with an edge of the carriage.

* * * * *

REEXAMINATION CERTIFICATE (4092nd)

United States Patent [19]
Burleigh et al.

[11] B1 4,790,601
[45] Certificate Issued May 30, 2000

[54] CHILD'S SEAT FOR A MOTOR VEHICLE

[75] Inventors: David W. Burleigh, Bognor Regis, United Kingdom; Waldemar Czernakowski, Blaustein; Hermann Wetter, Ulm, both of Germany

[73] Assignees: Britax-Excelsior Limited, Weybridge, United Kingdom; Romer-Britax Autogurte GmbH, Ulm/Donau, Germany

Reexamination Request:
No. 90/005,175, Dec. 2, 1998

Reexamination Certificate for:
Patent No.: 4,790,601
Issued: Dec. 13, 1988
Appl. No.: 07/177,769
Filed: Apr. 5, 1988

[30] Foreign Application Priority Data

Apr. 15, 1987 [GB] United Kingdom .................. 8709141

[51] Int. Cl.$^7$ .................................................. A47D 15/00
[52] U.S. Cl. ........................................... 297/484; 297/473
[58] Field of Search .................................. 297/484, 468, 297/475, 485

[56] References Cited

U.S. PATENT DOCUMENTS

| | | | |
|---|---|---|---|
| 3,910,634 | 10/1975 | Morris | 297/484 |
| 4,040,664 | 8/1977 | Tanaka et al. | 297/484 |
| 4,402,548 | 9/1983 | Mason | 297/484 |
| 4,436,341 | 3/1984 | Converse | 297/484 |

FOREIGN PATENT DOCUMENTS 60-114052  8/1985  Japan .

*Primary Examiner*—Laurie K. Cranmer

[57] ABSTRACT

A child's seat for a motor vehicle comprises a back portion and a harness including two shoulder straps each of which projects through a respective opening in the back portion. Each opening is formed by the interaction of an elongate slot formed in the back portion and extending over the range of desired positions for the opening, with a horizontal slot in a carriage mounted on the rear side of the back portion for vertical sliding movement relative thereto. Manually operable control means is arranged to vary the position of the carriage relative to the back portion.

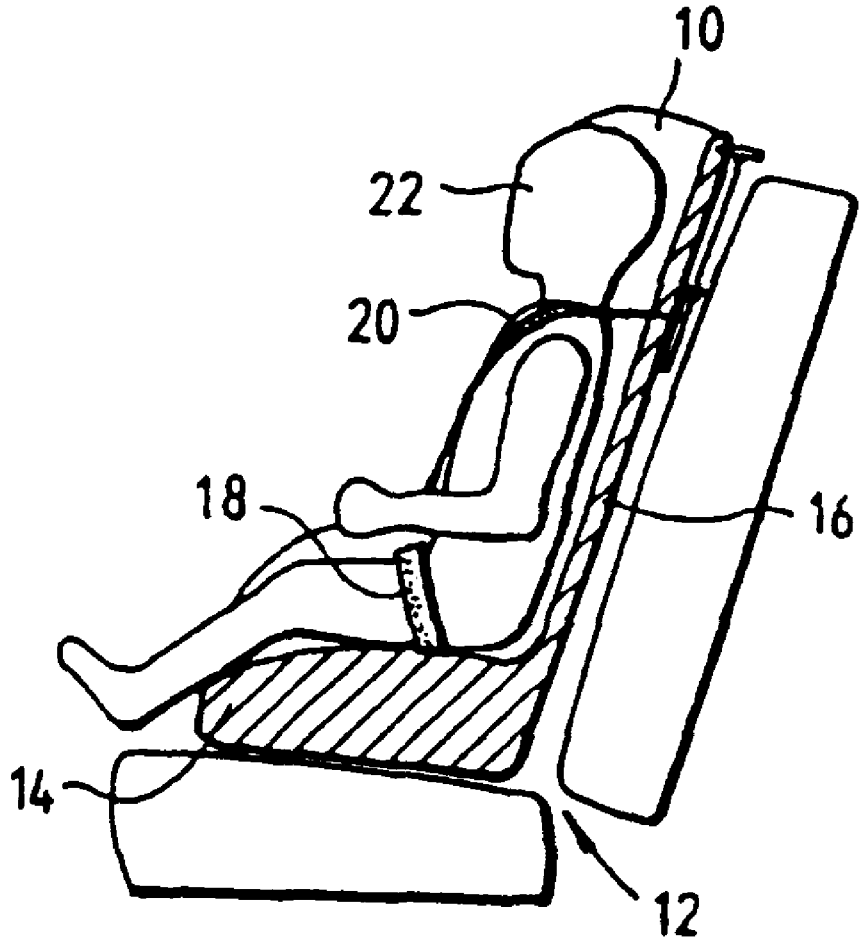

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2–8 are determined to be patentable as amended.

New claims 9–14 are added and determined to be patentable.

2. [A child's seat according to claim 1] *A child's seat for a motor vehicle comprising a back portion, a harness including two shoulder straps, two elongate slots formed in the back portion with each slot extending over the range of desired positions for the opening for a respective shoulder strap, a carriage mounted on the rear side of the back portion for vertical sliding movement relative thereto, two horizontal slots in the carriage each aligned with a respective one of the elongate slots in the back portion so as to define a respective opening for each shoulder strap, and control means for varying the position of the carriage relative to the back portion; and*

*wherein the elongate slots are inclined so that their upper ends are further apart than their lower ends.*

3. A child's seat according to claim [1] *2*, wherein the two horizontal slots are formed in the same component of the carriage, each horizontal slot extending over the range of horizontal movement of the corresponding opening, the horizontal surfaces of the openings being defined by the walls of the horizontal slots and the vertical edges of the openings being defined by the edges of the elongate slots.

4. A child's seat according to claim [1] *2*, wherein each of the horizontal slots is of the same dimensions as the corresponding opening and is formed in a respective auxiliary carriage which is slideable horizontally relative to the main carriage and coupled to guide means extending parallel to the corresponding elongate slot.

5. A child's seat according to claim [1] *2*, wherein the control means comprises a crew-threaded rod journaled in a bearing secured adjacent to the top edge of the rear surface of the seat back and engaging in a tapped hole in the carriage.

6. A child's seat according to claim [1] *2*, wherein the control means comprises a spring arranged to bias the carriage downwardly relative to the seat back and a flexible tension member having one end connected to the carriage and its other end wound on a drum which is rotatable mounted adjacent to the top edge of the rear surface of the seat back, a manually releasable ratchet assembly being arranged to resist rotation of the drum in the unwinding direction.

7. A child's seat according to claim [1] *2*, wherein the control means comprises a vertically oriented row of ratchet teeth on the rear carriage and a detent mounted on a resilient arm which has one end secured to the rear of the seat back.

8. A child's seat according to claim [1] *2*, wherein the control means comprises a cam wheel eccentrically journaled on an axle secured to the rear [iof] *of* the seat back, the edge of the cam wheel engaging with an edge of the carriage.

9. *A child's seat according to claim 2, wherein a component of the carriage in which the horizontal slots are formed is on the rear side of the back portion.*

10. *A child's seat according to claim 2, wherein the control means comprises a row of teeth and a mating cooperating detent for engaging a desired row of teeth.*

11. *A child's seat according to claim 2, wherein a component of the carriage in which the horizontal slots are formed is on the rear side of the back portion; and*

*the control means comprises a row of teeth and a mating cooperating detent for engaging a desired row of teeth.*

12. *A child's seat according to claim 2, wherein the control means comprises a row of teeth and a mating cooperating means for engaging a desired row of teeth.*

13. *A child's seat according to claim 2, wherein a component of the carriage in which the horizontal slots are formed is on the rear side of the back portion; and*

*the control means comprises a row of teeth and a mating cooperating means for engaging a desired row of teeth.*

14. *A child's seat according to claim 3, wherein the component of the carriage in which the horizontal slots are formed is on the rear side of the back portion.*

\* \* \* \* \*